United States Patent
Satoh et al.

(10) Patent No.: US 6,562,508 B1
(45) Date of Patent: *May 13, 2003

(54) SECONDARY CELL

(75) Inventors: Kouichi Satoh, Osaka (JP); Naoya Nakanishi, Osaka (JP); Kazuyasu Fujiwara, Osaka (JP); Toshiyuki Nohma, Osaka (JP); Ikuo Yonezu, Osaka (JP)

(73) Assignee: Sanyo Electric Co., LTD, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/385,454

(22) Filed: Aug. 30, 1999

(30) Foreign Application Priority Data

Sep. 3, 1998 (JP) ............................................. 10-248945

(51) Int. Cl.⁷ .......................... H01M 2/12; H01M 2/00; H01M 2/08
(52) U.S. Cl. .............................. 429/53; 429/56; 429/57; 429/163; 429/175
(58) Field of Search ........................... 429/56, 57, 175, 429/163, 53

(56) References Cited

U.S. PATENT DOCUMENTS

| | | | |
|---|---|---|---|
| 3,897,270 A | * 7/1975 | Rosansky | 429/56 |
| 4,191,806 A | 3/1980 | Levy | |
| 4,467,021 A | * 8/1984 | Stocchiero | 429/175 |
| 5,080,985 A | * 1/1992 | Wiacek et al. | 429/172 |
| 5,279,907 A | 1/1994 | Paterek et al. | |
| 5,554,455 A | 9/1996 | Inoue et al. | |
| 5,677,076 A | * 10/1997 | Sato et al. | 429/56 |
| 6,010,803 A | * 1/2000 | Heller, Jr. et al. | 429/175 |

FOREIGN PATENT DOCUMENTS

JP 6-68861 3/1994

* cited by examiner

*Primary Examiner*—Patrick Ryan
*Assistant Examiner*—Julian Mercado
(74) *Attorney, Agent, or Firm*—Rader Fishman & Grauer (57) ABSTRACT

A secondary cell comprises a gastight can 1 having a cylinder 11 and a lid 12 fixed to an opening portion of the cylinder, and a secondary cell element accommodated in the can 1. The lid 12 is fixedly provided with a gas vent closure 4 in the form of a disk and having a diaphragm 42 openable upon the internal pressure of the can 1 exceeding a predetermined value. The gas vent closure 4 has an outer peripheral portion welded to an opening edge defining a through bore 14 formed in the lid 12. The lid 12 is formed in a front surface thereof with a circumferential groove 5 surrounding the welded portion of the gas vent closure 4, and a diminished portion 51 is provided between the groove 5 and the welded portion for reducing the sectional area of a heat flow path for the heat of welding to pass therethrough. The lid 12 thus constructed makes it possible to weld the vent closure 4 to the lid 12 free of defects such as pinholes or cracks.

22 Claims, 10 Drawing Sheets

SECONDARY CELL

FIELD OF THE INVENTION

The present invention relates to secondary cells which comprise a can and a rolled-up electrode unit or like cell element accommodated in the can and which are adapted to deliver electric power generated by the cell element from a pair of electrode terminals attached to the can.

BACKGROUND OF THE INVENTION

Figure 11:
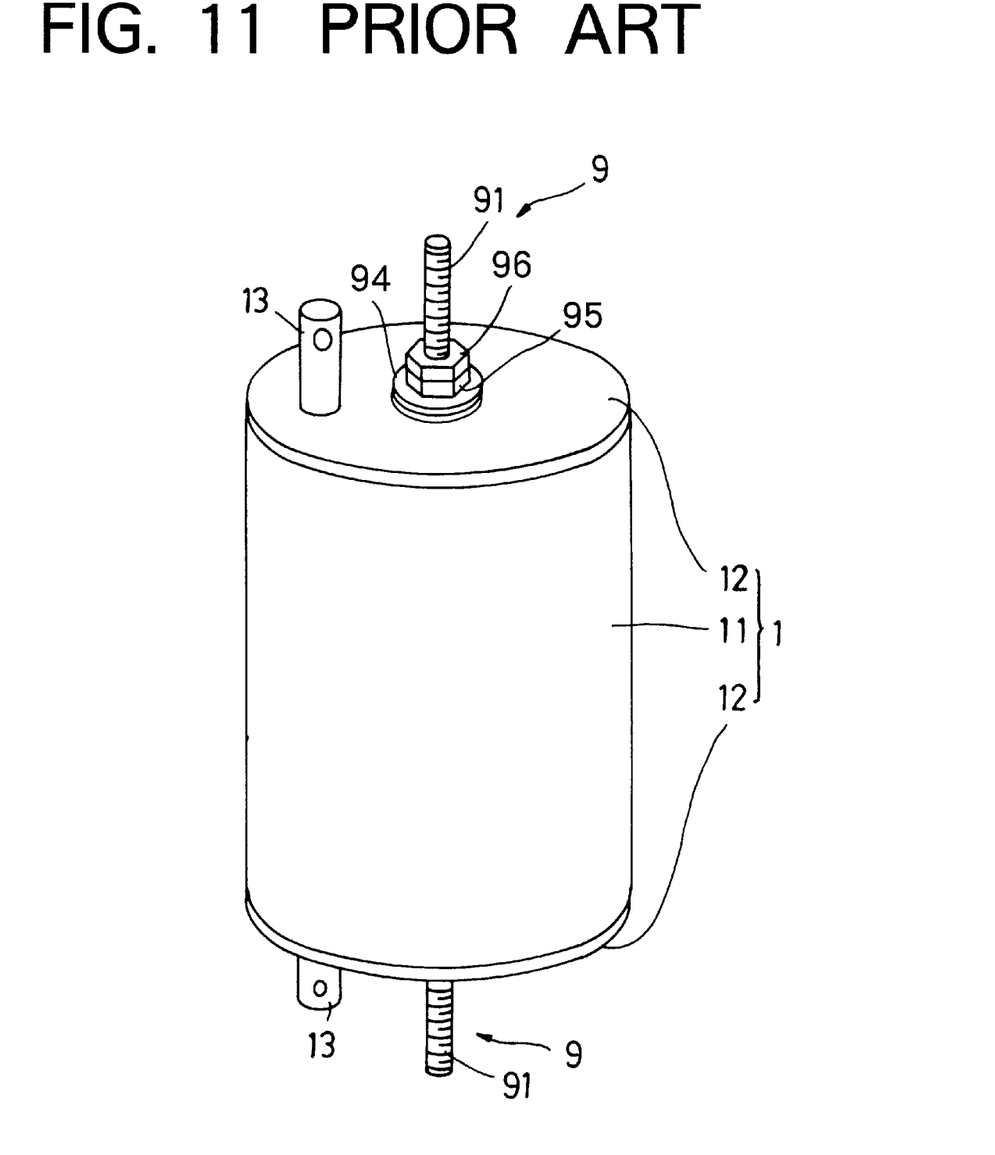
FIG. 11 is a perspective view of a cylindrical lithium secondary cell provided with conventional pressure relief gas vent plugs.
Figure 12:
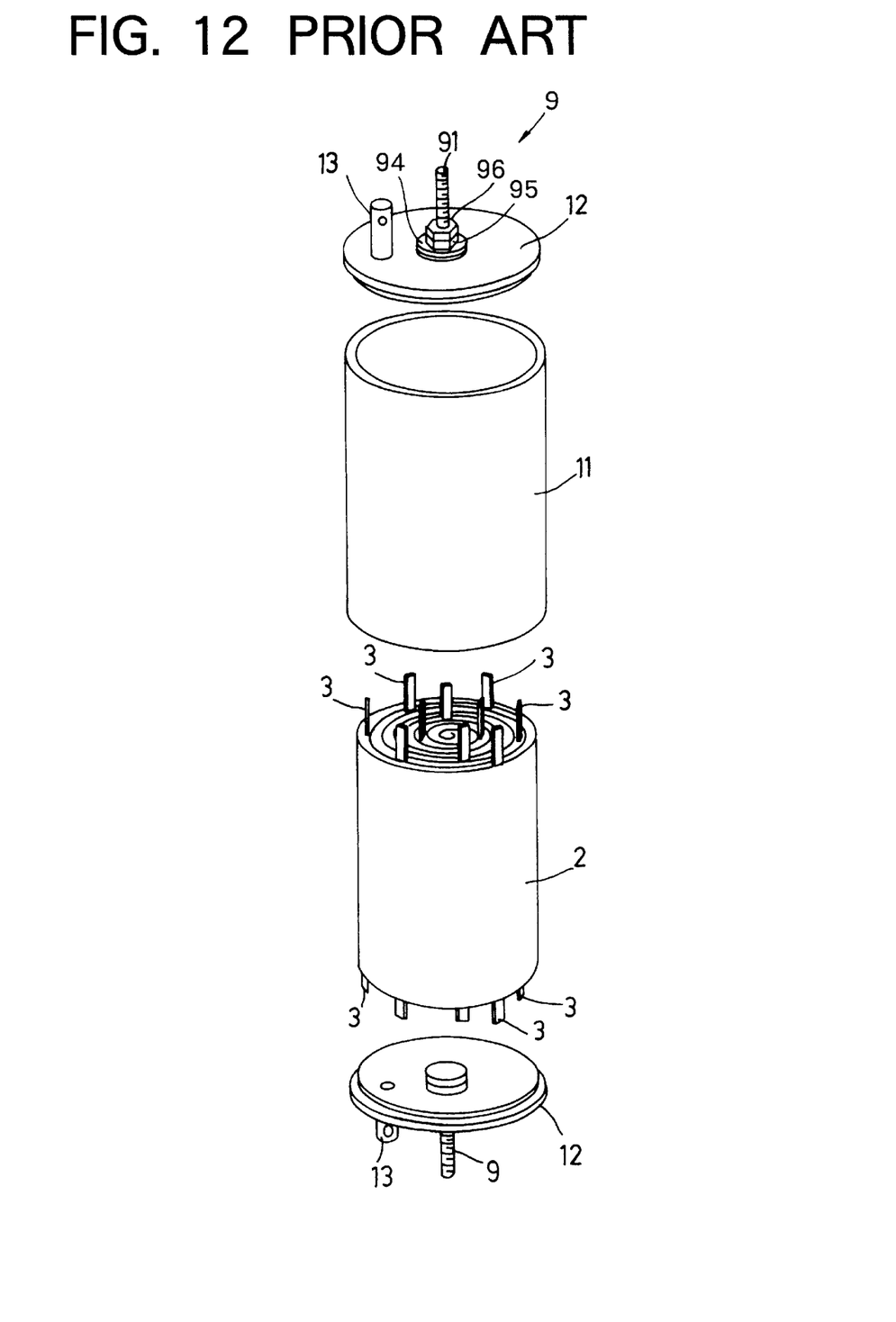
FIG. 12 is an exploded perspective view of the secondary cell.

In recent years, attention has been directed to lithium secondary cells or batteries having a high energy density for use as power sources for portable electronic devices, electric motor vehicles, etc. Cylindrical lithium secondary cells of relatively large capacity, for example, for use in electric motor vehicles comprise, as shown in FIGS. 11 and 12, a cylindrical can 1 having a cylinder 11 and lids 12, 12 welded to the respective ends thereof, and a rolled-up electrode unit 2 encased in the can 1. A pair of positive and negative electrode terminal assemblies 9, 9 are attached to the lids 12, 12, respectively. The rolled-up electrode unit 2 is connected to the terminal assemblies 9, 9 by a plurality of electrode tabs 3, whereby the electric power generated by the electrode unit 2 can be delivered to an external device from the pair of terminal assemblies 9, 9. Each lid 12 is provided with a pressure-relief gas vent plug 13.

Figure 13:
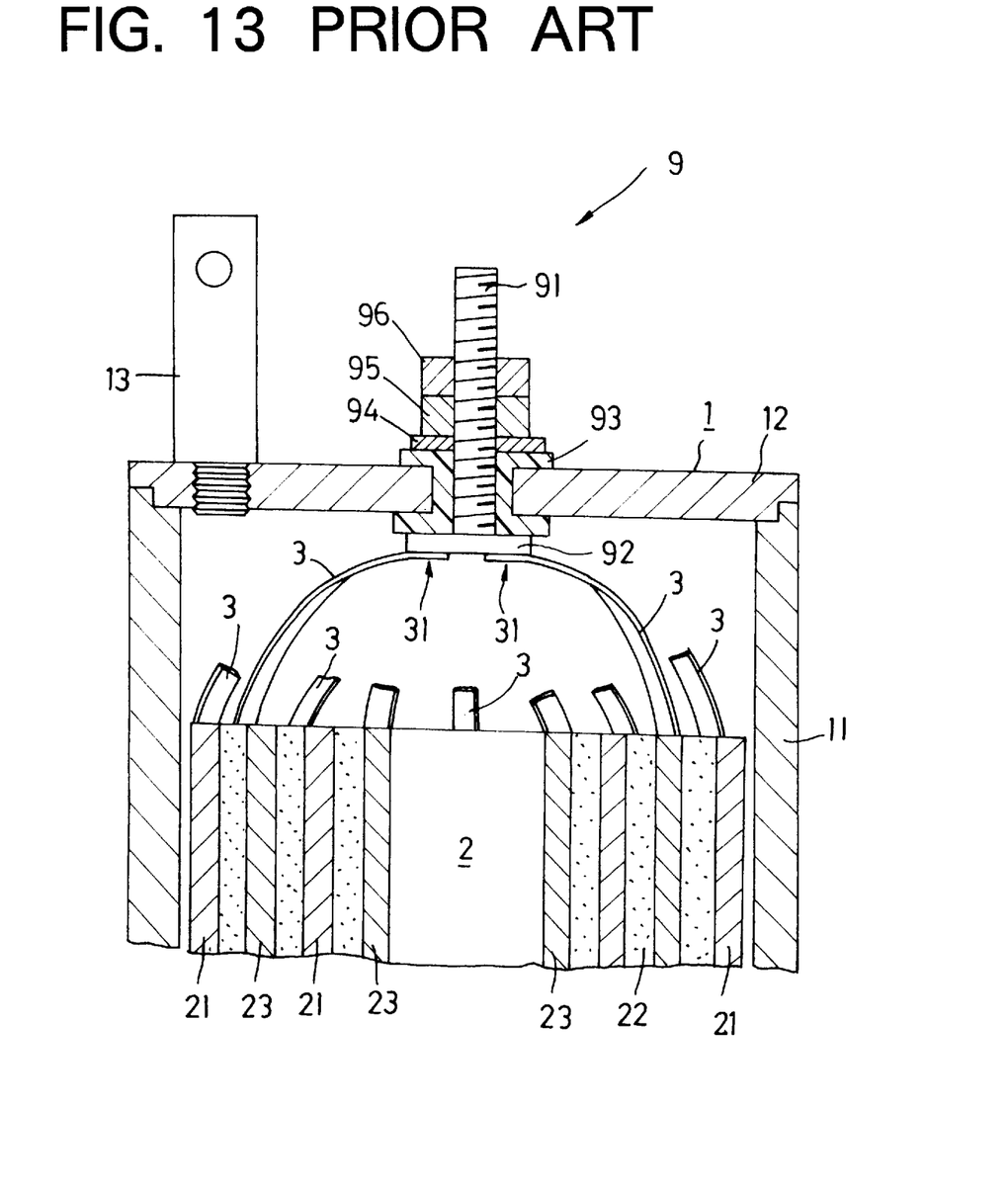
FIG. 13 is a fragmentary view in section of the secondary cell.

With reference to FIG. 13, the rolled-up electrode unit 2 comprises a positive electrode 21 containing a lithium containing composite oxide, a negative electrode 23 containing a carbon material, and a separator 22 impregnated with a nonaqueous electrolyte and interposed between the electrodes, the assembly of the these components 21 to 23 being rolled up into a cylinder. A plurality of electrode tabs 3 outwardly extend from each of the positive electrode 21 and the negative electrode 23 of the unit 2, and the outer ends 31 of the electrode tabs 3 of the same polarity are joined to one electrode terminal assembly 9. For convenience' sake, only some of these tabs are shown as being joined to the terminal assembly 9 in FIG. 13, while the connection of the ends of the other tabs to the assembly 9 is omitted from the illustration.

The electrode terminal assembly 9 comprises a screw member 91 extending a hole in the lid 12 of the can 1 and mounted on the lid 12. The screw member 91 has a flange 92 at its base end. An insulating packing 93 is fitted in the hole of the lid 12 for electrically insulating the screw member 91 from the lid 12 and providing a seal therebetween. The screw member 91 has a washer 94 fitted therearound from outside the cylinder 11, and a first nut 95 and a second nut 96 screwed thereon similarly. The first nut 95 is tightened up to clamp the insulating packing 93 between the flange 92 of the screw member 91 and the washer 94 and thereby seal off the hole more effectively. The outer ends 31 of the electrode tabs 3 are fixedly joined to the flange 92 of the screw member 91 by spot welding or ultrasonic welding.

Figure 9:
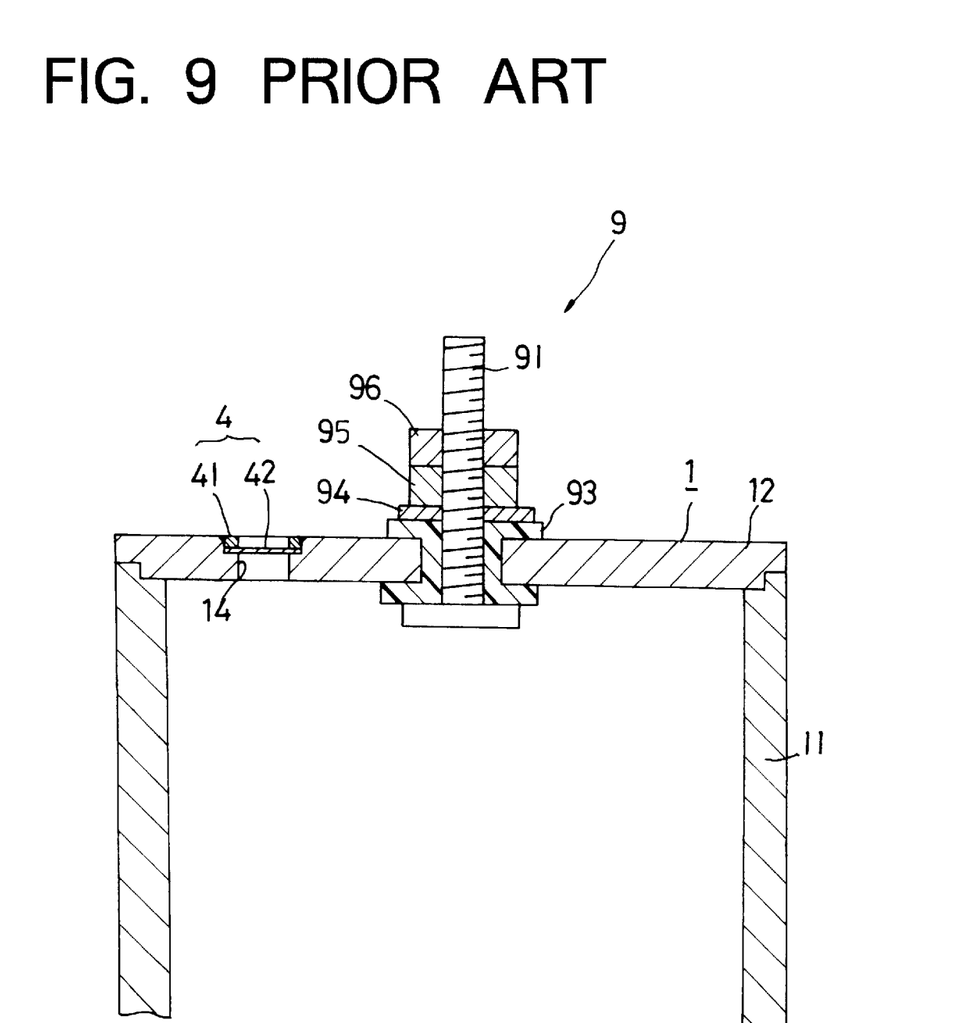
FIG. 9 is a fragmentary view in section of a secondary cell having a conventional pressure-relief gas vent closure.
Figure 10:
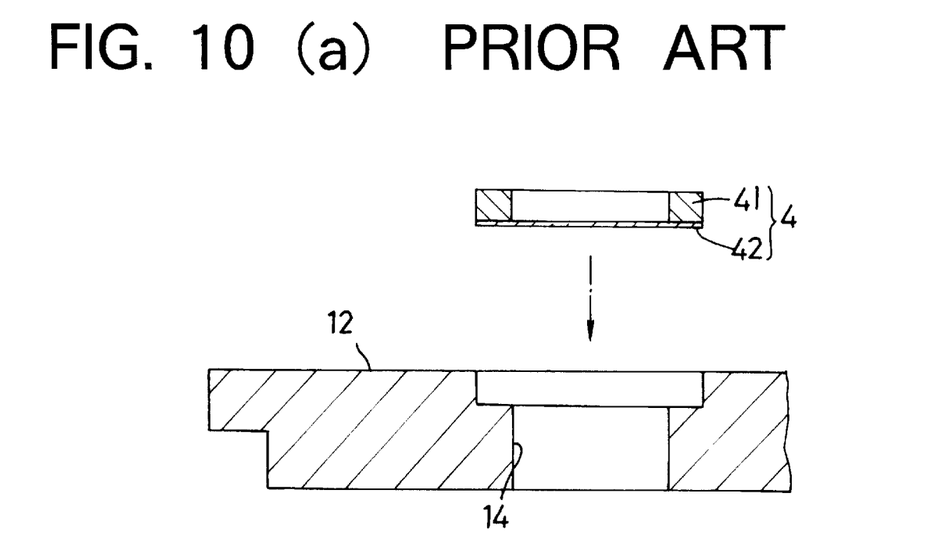
FIG. 10(a) and FIG. 10(b) are sectional views showing the step of welding the gas vent closure to a lid for the fabrication of the secondary cell.

FIG. 9 shows a known secondary cell which is provided with a pressure relief gas vent closure 4 fitted in a through bore 14 formed in a lid 12 and operable upon the internal pressure of a cell can 1 exceeding a predetermined value (JP-A No. 68861/1994). As shown in FIG. 10(a), the gas vent closure 4 comprises a ring 41 and a disklike diaphragm 42 fixed thereto. The gas vent closure 4 is fixed to the lid 12 by joining the outer periphery of the ring 41 to an opening edge of the bored portion 14 of the lid 12 by laser welding at 15 as seen in FIG. 10(b).

With large-sized secondary cells, however, the lid 12 is as thick as at least several millimeters and has a very large thickness relative to the thickness of the gas vent closure 4. Consequently, when the closure 4 is fixed to the lid 12 by laser welding, there arises the problem that the weld develops defects, such as pinholes or cracks, because the heat of welding dissipates markedly, rapidly cooling the metal melted by being irradiated with the laser beam.

SUMMARY OF THE INVENTION

Accordingly, an object of the present invention is to provide a secondary cell wherein a gas vent closure can be welded to a lid without the occurrence of defects such as pinholes or cracks.

The present invention provides a secondary cell comprising a gastight can 1 having a cylinder 11 and a lid 12 fixed to an opening portion of the cylinder, and a secondary cell element accommodated in the can 1. The lid 12 is fixedly provided with a vent closure 4 in the form of a disk and having a diaphragm 42 openable upon the internal pressure of the can 1 exceeding a predetermined value, the vent closure 4 having an outer peripheral portion welded to an opening edge defining a through bore 14 formed in the lid 12. The lid 12 has a diminished portion 51 provided around the welded portion of the vent closure 4 for reducing the sectional area of a heat flow path for the heat of welding to pass therethrough.

Since the secondary cell of the invention described has the diminished portion 51 around the welded portion of the vent closure 4, the heat of welding is transferred first to the diminished portion 51 and then to other portion around the diminished portion 51 for dissipation. The heat capacity of the diminished portion 51 is much smaller than that of the entire lid 12, while the sectional area of the heat flow path for the heat flux to pass through is also small in the diminished portion 51, with the result that the diminished portion 51 provides resistance to heat conduction to suppress the dissipation of the heat of welding. Consequently, the weld cools at a suitable rate, solidifying without developing pinholes or cracks.

Stated specifically, the lid 12 is formed in the front surface or rear surface thereof with a circumferential groove 5 surrounding the welded portion of the vent closure 4, and the diminished portion 51 is formed between the welded portion of the vent closure 4 and a side wall of the lid defining the groove 5 and positioned closer to the vent closure 4.

Further stated specifically, the diminished portion 51 is alternatively provided by a cylindrical projection 6 jutting from the front surface of the lid 12 and surrounding the through bore 14, and the vent closure 4 is fixed to a central opening portion of the projection by welding.

Preferably, the circumferential groove 5 has a width in the range of 1/50 of the inside diameter of the through bore 14 formed in the lid 12 to a value equal to the inside diameter, and a depth up to 2/3 of the thickness of the lid 12. If the width of the groove 5 is less than 1/50 of the inside diameter of the bore 14, the diminished portion 51 produces a low effect, whereas if the groove width is greater than the inside diameter, there arises a problem with respect to the strength of the lid 12. Further when the groove depth is greater than 2/3 of the thickness of the lid 12, a problem as to the strength of the lid 12 will also result.

The secondary cell is, for example, at least 5 Ah to not greater than 200 Ah in capacity and 1 to 5 mm in the thickness of the lid 12. With secondary cells having such a large size or capacity, heat is markedly dissipated from the welded portion of the conventional gas vent closure, whereas the diminished portion 51 of the present invention produces an outstanding effect.

With the secondary cell of the present invention, the provision of the diminished portion 51 for the lid 12 suppresses the dissipation of heat that occurs when the vent closure 4 is welded to the lid 12, permitting the metal melted by welding to cool at an appropriate rate and therefore obviating the likelihood that the welded portion will develop pinholes, cracks or like defects.

DETAILED DESCRIPTION OF EMBODIMENTS

With reference to the drawings, a detailed description will be given of embodiments of the invention as applied to the large-sized lithium secondary cell (5 Ah to 200 Ah in capacity) shown in FIGS. 11 to 13. Throughout the drawings, like parts are designated by like reference numerals and will not be described repeatedly.

First Embodiment

Figure 1:
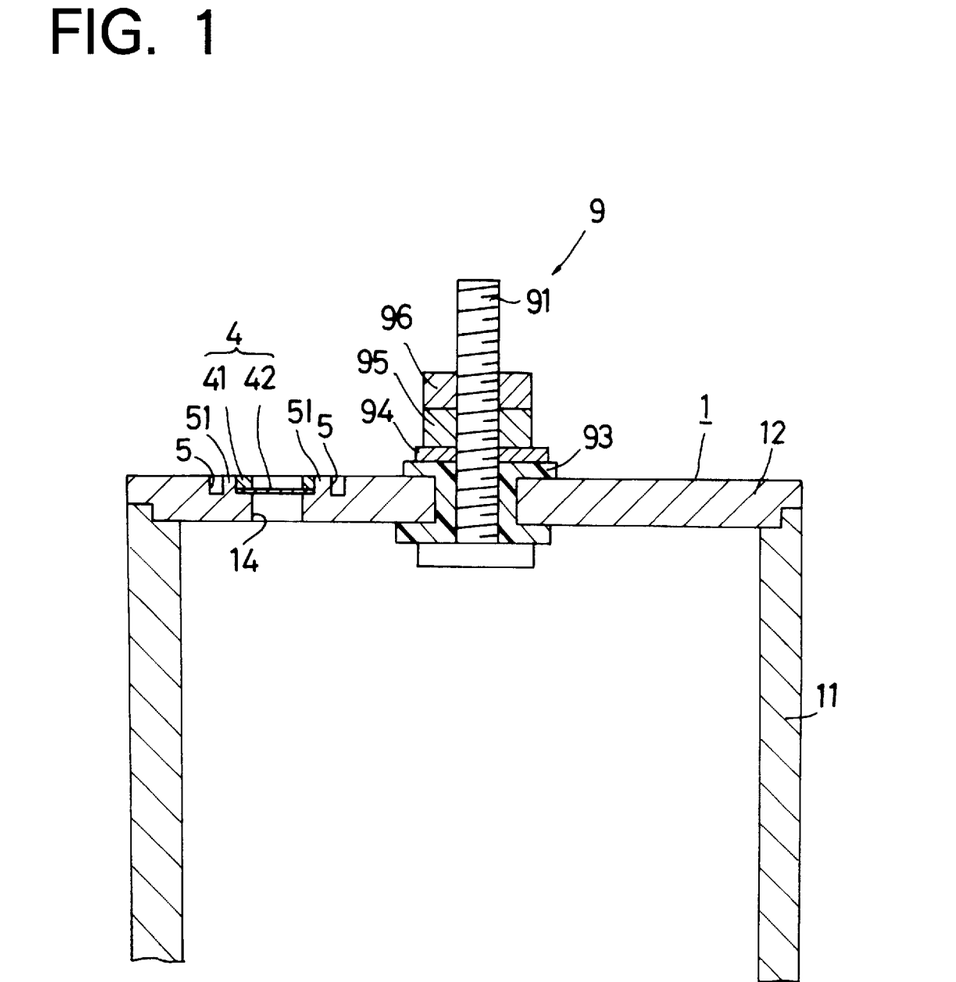
FIG. 1 is a fragmentary view in section showing a secondary cell as a first embodiment of the invention.

With reference to FIG. 1, the secondary cell of this embodiment has a can 1 including a lid 12, which is formed with a through bore 14. A gas vent closure 4 closing the bore 14 is fixed to the lid 12 by welding. The front surface of the lid 12 is formed with a circumferential groove 5 surrounding the gas vent closure 4 and with a diminished portion 51 between the groove 5 and the vent closure 4.

Figure 2:
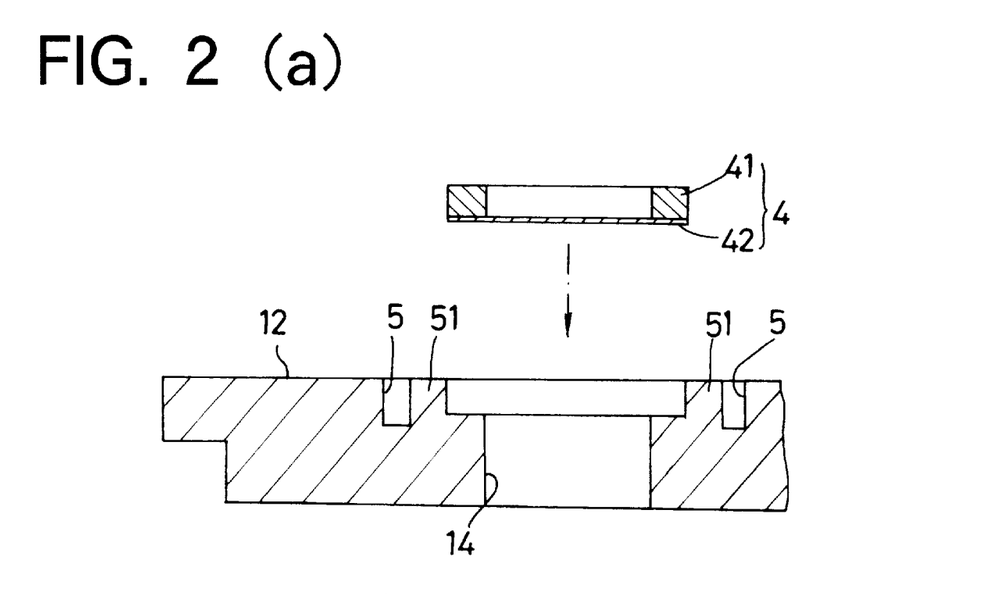
FIG. 2(a) and FIG. 2(b) are sectional views showing the step of welding a gas vent closure to a lid for the fabrication of the secondary cell.

The gas vent closure 4 comprises an annular ring 41 and a diaphragm 42 in the form of a disk and fixed to the ring 41 as seen in FIG. 2(a). On the other hand, the through bore 14 formed in the lid 12 includes a stepped groove permitting the vent closure 4 to engage in.

With the gas vent closure 4 fitted in the through bore 14 of the lid 12 as seen in FIG. 2(b), the ring 41 has an outer peripheral portion thereof fixed to the lid 12 by laser welding. Since the surface of the lid 12 has the annular diminished portion 51 around the welded portion 15 of the vent closure 4, the heat of welding is transferred first to the diminished portion 51 and then to other portion around the diminished portion 15 for dissipation. Accordingly the diminished portion 51 offers resistance to heat conduction to suppress the dissipation of the heat of welding. Consequently, the weld 15 melted is gradually cooled, and the vent closure 4 is welded and fixed to the lid 12 without developing pinholes or cracks.

Figure 3:
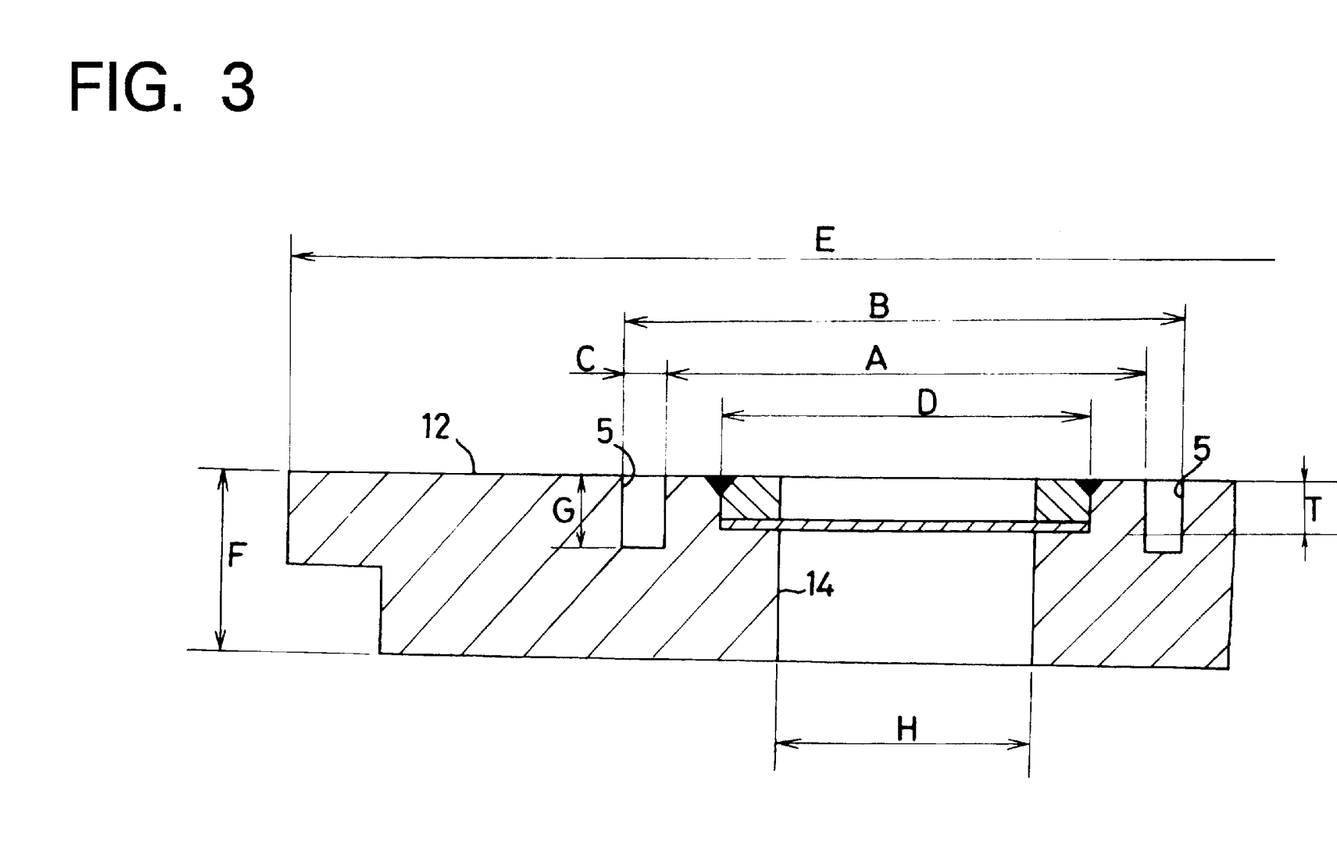
FIG. 3 is a view in section showing the dimensions of various portions of the lid.

According to the present embodiment, the lid 12 is made of aluminum. With reference to FIG. 3, the lid 12 is 60 mm in outside diameter E, 4 mm in thickness F, 1.0 mm in thickness T, 7 mm in inside diameter H, 11 mm in the diameter A of inner periphery of the circumferential groove 5, 13 mm in the diameter B of outer periphery thereof, 1 mm in width C of the circumferential groove 5 and 1.5 mm in groove depth C. The gas vent closure 4 is 9 mm in outside diameter D.

To substantiate the advantage of the secondary cell of the present invention described, ten lids 12 formed with the diminished portion 51 were prepared for cell cans of the invention, and ten lids having no diminished portion 51 for cell cans of Comparative Example. The lids were checked for a leak using nitrogen gas and for the operating pressure of the gas vent closure. Table 1 shows the results. For leak checking, nitrogen gas was used to apply a pressure of 3 Kg/cm$^2$ to the lid, and a soap solution was used to detect a leak. The gas vent closures used were those meeting diaphragm operating pressure specification of 8±1 Kg/cm$^2$.

TABLE 1

|  | LOT NO. | RESULT OF LEAK CHECK | OPERATING PRESSURE [kg/cm$^2$] | NOTE |
|---|---|---|---|---|
| INVENTION | 1 | ○ | 8 | |
| | 2 | ○ | 7 | |
| | 3 | ○ | 8 | |
| | 4 | ○ | 8 | |
| | 5 | ○ | 7 | |
| | 6 | ○ | 8 | |
| | 7 | ○ | 8 | |
| | 8 | ○ | 8 | |
| | 9 | ○ | 9 | |
| | 10 | ○ | 7 | |
| COMP. EX. | 11 | ○ | 7 | |
| | 12 | X | — | PINHOLES, CRACKS |
| | 13 | X | — | PINHOLES, CRACKS |
| | 14 | ○ | 5 | OPERATING PRESSURE DROP |
| | 15 | ○ | 7 | |
| | 16 | X | — | PINHOLES, CRACKS |
| | 17 | ○ | 4 | OPERATING PRESSURE DROP |
| | 18 | X | — | PINHOLES, CRACKS |
| | 19 | ○ | 4 | OPERATING PRESSURE DROP |

The results given in Table 1 reveal that the lids of the invention were free of leaks and exhibited the specified operating pressure. In the case of the lids of Comparative Example, four developed pinholes or cracks and a drop in the operating pressure of the gas vent closure was found in three. The pinholes or cracks are thought attributable to a rapid drop in the temperature of the weld due to marked dissipation of the heat of laser welding. The operating pressure drop appears attributable to marked dissipation of the heat of laser welding, which necessitates an excessively prolonged welding time, consequently overheating the diaphragm 42 of the gas vent closure 4 and deforming the diaphragm 42 due to a thermal stress to locally create a portion of reduced thickness.

Figure 4:
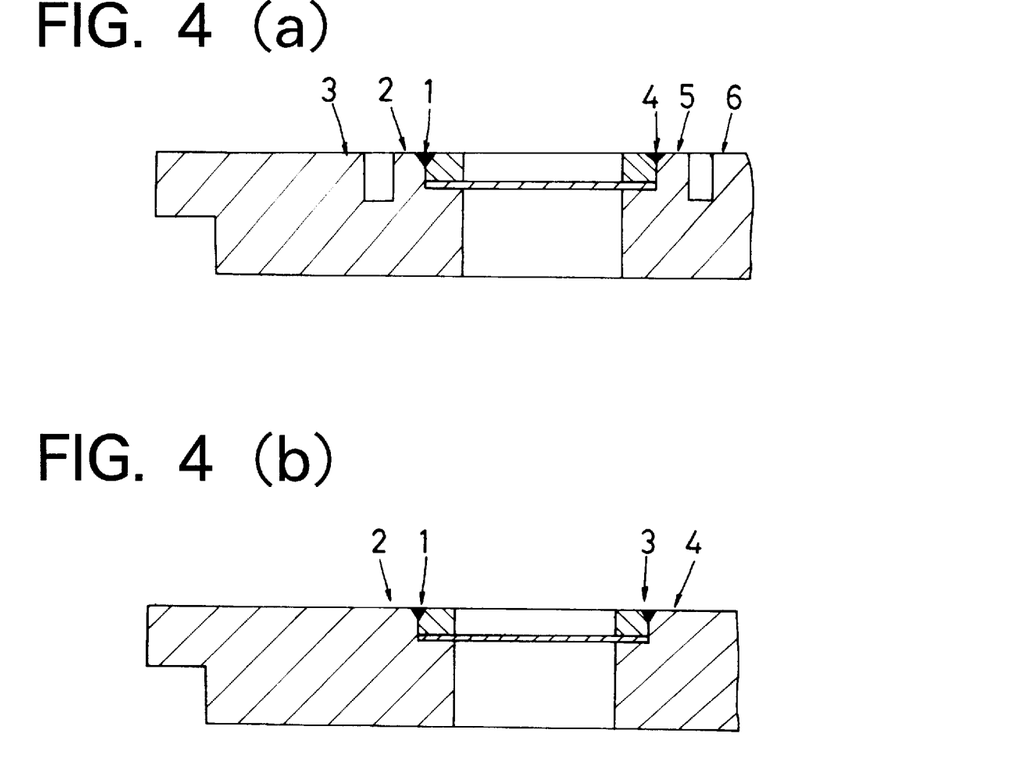
FIG. 4(a) and FIG. 4(b) are views of the lid of the invention and conventional lid for comparison, respectively, to show temperature measuring locations.

The lid of the invention (FIG. 4(a)) and the conventional lid having no diminished portion 51 (FIG. 4(b)) were further checked by a thermography for temperature at various portions of each lid 12 immediately after (i.e., 5 seconds after, and 20 seconds after) the gas vent closure 4 was fixed to the lid by laser welding. Tables 2 and 3 show the results. Each measuring location number listed corresponds to the position indicated by the same number in FIG. 4(a) or (b).

TABLE 2

| MEASURING LOCATION NO. | TEMPERATURE [° C.] | |
|---|---|---|
| | AFTER 5 SEC. | AFTER 20 SEC. |
| 1 | 160 | 150 |
| 2 | 155 | 145 |
| 3 | 120 | 100 |
| 4 | 160 | 150 |
| 5 | 155 | 145 |
| 6 | 120 | 100 |

TABLE 3

| MEASURING LOCATION NO. | TEMPERATURE [° C.] | |
|---|---|---|
| | AFTER 5 SEC. | AFTER 20 SEC. |
| 1 | 150 | 90 |
| 2 | 130 | 70 |
| 3 | 150 | 90 |
| 4 | 130 | 70 |

In the case of the conventional lid, marked heat dissipation occurs at the time of welding, entailing a rapid drop in temperature after welding and creating pinholes or cracks in the weld as stated above. With the lid of the invention, on the other hand, the provision of the portion of diminished heat flow path results in a relatively small reduction in temperature after welding, permitting welding of the gas vent closure without entailing the occurrence of pinholes or cracks as described above.

Further to determine an optimum width range of the circumferential groove 5 of the secondary cell of the invention described, lids were prepared according to the invention which were 60 mm in diameter and 4.1 mm in thickness and which were formed with a through bore 14 with an inside diameter of 10 mm and a circumferential groove 5 with a depth of 1.5 mm, the grooves 5 of the lids varying in width. Each lid was checked for temperature 5 seconds after welding the gas vent closure thereto and also checked for a leak at a nitrogen gas pressure of 3 Kg/cm². Also prepared were lids having no through bores 14 but each having only a circumferential groove 5 which had the same size as that of the corresponding lid prepared above. These lids were checked for a leak at a nitrogen gas pressure of 20 Kg/cm² and also checked for deformation and distortion by a level. Table 4 shows the results.

TABLE 4

| GROOVE WIDTH [mm] (1/H) | NO. 1 TEMP. AFTER WELDING | NO. 2 TEMP. AFTER WELDING | RESULT OF LEAK CHECK | RESULT OF PRESSURE RESISTANCE TEST |
|---|---|---|---|---|
| 0.1 | 150 | 115 | X | ○ |
| 0.2(1/50) | 160 | 145 | ○ | ○ |
| 0.5 | 160 | 150 | ○ | ○ |
| 1(1/10) | 160 | 150 | ○ | ○ |
| 2(1/5) | 160 | 150 | ○ | ○ |
| 5(1/2) | 160 | 150 | ○ | ○ |
| 10(1) | 165 | 155 | ○ | SLIGHT DISTORTION NEAR GROOVE OF LID |
| 15(3/2) | 165 | 155 | ○ | MARKED BULGING NEAR GROOVE OF LID AT 18 kg/cm² |

The results given in Table 4 reveal that when the width of the circumferential groove 5 is smaller than 1/50 of the inside diameter of the through bore 14, a marked temperature drop occurs in the vicinity of the weld to create pinholes. Further if the width of the groove 5 is greater than the inside diameter of the through bore 14, the lid 12 exhibits a seriously impaired strength, failing to withstand the specified pressure (20 Kg/cm²). Accordingly, the width of the groove 5 is preferably in the range of 1/50 of the inside diameter H of the lid through bore 14 to the value H.

Further to determine an optimum depth range of the circumferential groove 5 of the secondary cell of the invention described, lids were prepared which were 1 mm in the width of the groove 5, have varying groove depths and are otherwise dimensioned the same as the foregoing lids. The lids were similarly tested for pressure resistance with the results shown in Table 5.

TABLE 5

| GROOVE DEPTH [mm] (1/F) | RESULT OF PRESSURE RESISTANCE TEST |
|---|---|
| 0.5 | ○ |
| 1.3 | ○ |
| 2.0 | ○ |
| 2.7(2/3) | ○ |
| 3.4 | SLIGHT DISTORTION NEAR GROOVE OF LID |
| 4.0 | MARKED BULGING NEAR GROOVE OF LID AT 13 kg/cm² |

The results given in Table 5 indicate that a problem will result as to the strength of the lid 12 if the depth of the circumferential groove 5 exceeds 2/3 of the thickness F of the lid 12. Accordingly, it is desired that the groove 5 have a depth not greater than 2/3 of the thickness F of the lid 12.

Second Embodiment

Figure 5:
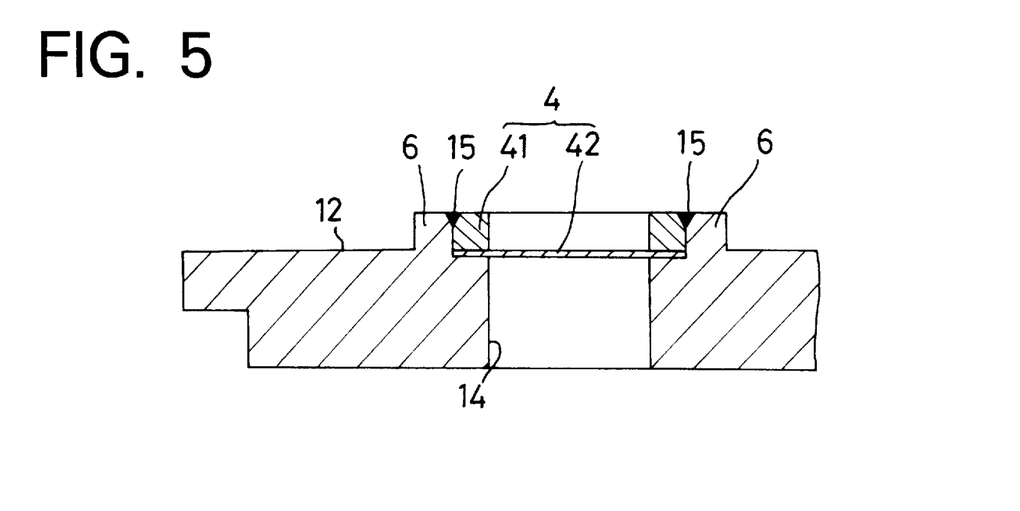
FIG. 5 is a view in section of a lid according to a second embodiment.

As shown in FIG. 5, the secondary cell of this embodiment has a cylindrical projection 6 jutting from the front surface of a lid 12 and surrounding a through bore 14, and a gas vent closure 4 is fixed to a central opening portion of the projection 6 by welding. In this secondary cell, the projection 6 serves as the diminished portion 51 described to suppress the dissipation of heat from the weld 15.

Third Embodiment

Figure 6:
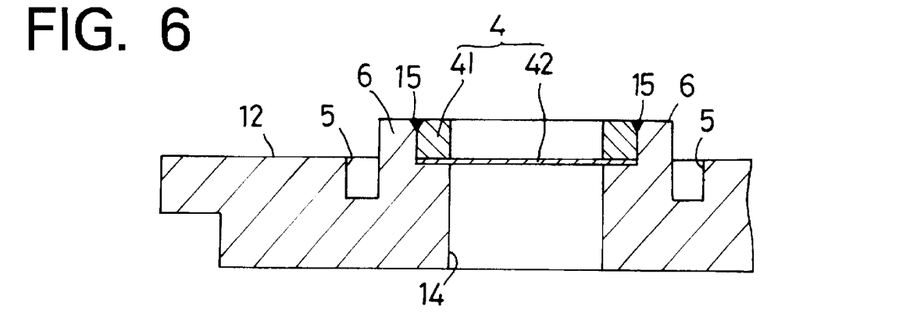
FIG. 6 is a view in section of a lid according to a third embodiment.

With reference to FIG. 6, the secondary cell of this embodiment is formed, around the projection 6 of the second embodiment, with the same circumferential groove 5 as in the first embodiment.

Fourth Embodiment

Figure 7:
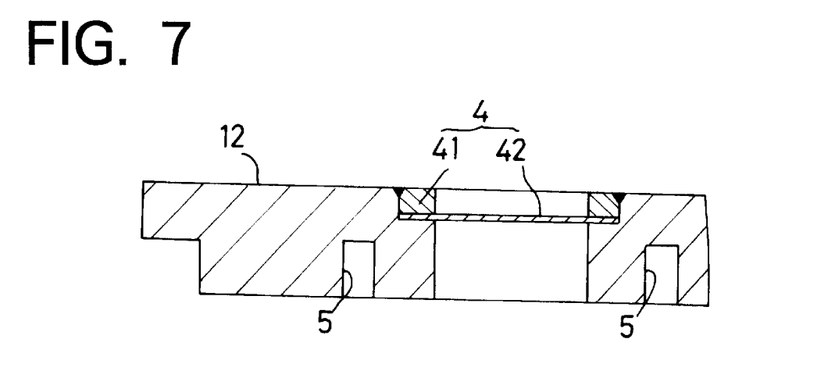
FIG. 7 is a view in section of a lid according to a fourth embodiment.

With reference to FIG. 7, the secondary cell of this embodiment has a circumferential groove 5 formed in the rear surface of a lid 12 and similar to the groove 5 of the first embodiment. With this secondary cell, the same diminished portion 51 as already described is formed between the bottom of the groove 5 and the front surface of the lid 12.

Fifth Embodiment

Figure 8:
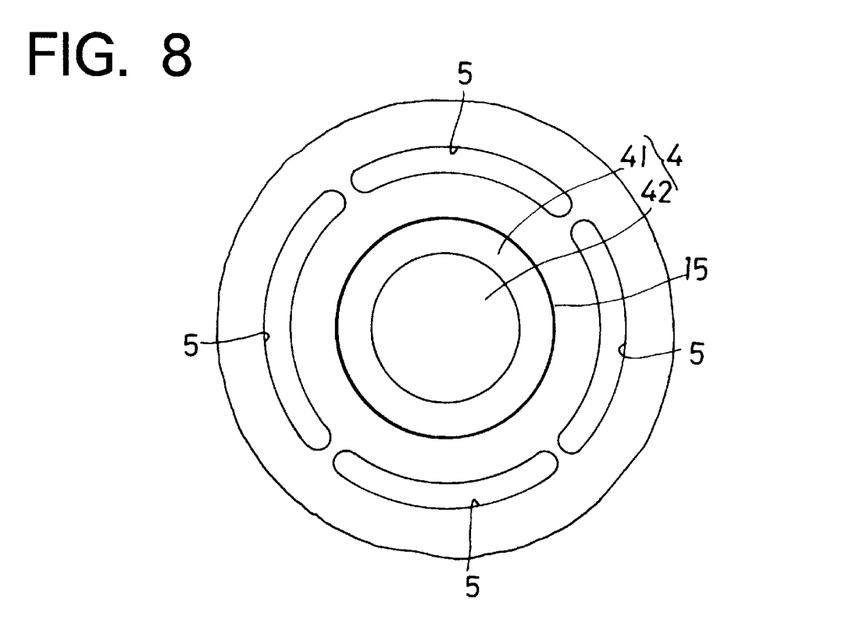
FIG. 8 is a plane view of a plurality of circumferential grooves formed in the lid of a fifth embodiment.

With reference to FIG. 8, the secondary cell of this embodiment has a discrete circumferential groove 5 which is divided at one or more portions unlike the continuous groove 5 of the first embodiment. Instead of these divided groove portions 5, a multiplicity of circular bores can be arranged in a circular arrangement.

Any of the second to fifth embodiments described of course has the same advantage as the secondary cell of the first embodiment.

The secondary cell of the present invention is not limited to the foregoing embodiments in construction but can be modified variously by one skilled in the art without departing from the spirit of the invention as set forth in the appended claims.

What is claimed is:

1. A secondary cell comprising a gastight can including a cylinder and a lid fixed to an opening portion formed in the cylinder, and a secondary cell element accommodated in the can, the lid being fixedly provided with a vent closure in a form of a disk and having a diaphragm openable upon internal pressure of the can exceeding a predetermined value, the vent closure having an outer peripheral portion welded to an opening edge defining a through bore formed in the lid, the through bore including a stepped groove permitting the vent closure to engage therein and sized to slidably receive the vent closure, a heat conducting portion formed in the lid being provided around and outside the welded portion of the vent closure and so shaped as to reduce a sectional area of a heat flow path for heat of the welded portion to pass therethrough.

2. A secondary cell according to claim 1 wherein the lid is formed in a front surface or rear surface thereof with a circumferential groove surrounding the welded portion of the vent closure, and the heat conducting portion is formed by a ring-shaped portion formed between the welded portion of the vent closure and a side wall of the lid defining the groove and positioned closer to the vent closure.

3. A secondary cell according to claim 2 wherein the circumferential groove has a width in the range of $1/50$ of an inside diameter of the through bore formed in the lid to a value equal to the inside diameter, and a depth up to $2/3$ of a thickness of the lid.

4. A secondary cell according to claim 1 wherein the heat conducting portion is provided by a cylindrical projection jutting from a front surface of the lid and surrounding the through bore, and the vent closure is fixed to a central opening portion of the projection by welding.

5. A secondary cell according to claim 1 which has a capacity of at least 5 Ah to not greater than 200 Ah, and the lid has a thickness of 1 to 5 mm.

6. A secondary cell according to claim 1, wherein the heat conducting portion formed in the lid is provided adjacent to and concentrically around the welded portion of the vent closure.

7. A secondary cell comprising a gastight can including a cylinder and a lid fixed to an opening portion formed in the cylinder, and a secondary cell element accommodated in the can, the lid being fixedly provided with a vent closure in a form of a disk and having a diaphragm openable upon internal pressure of the can exceeding a predetermined value, the vent closure having an outer peripheral portion welded to an opening edge defining a through bore formed in the lid, the through bore including a stepped groove permitting the vent closure to engage therein and sized to slidably receive the vent closure, a diminished portion formed in the lid being provided around the welded portion of the vent closure and so shaped as to reduce a sectional area of a heat flow path for heat of the welded portion to pass therethrough;

the lid being formed in a front surface or rear surface thereof with a circumferential groove being outside and surrounding the welded portion of the vent closure, and the diminished portion being formed by a ring-shaped portion formed between the welded portion of the vent closure and a side wall of the lid defining the groove and positioned closer to the vent closure.

8. A secondary cell according to claim 7 wherein the circumferential groove has a width in the range of $1/50$ of an inside diameter of the through bore formed in the lid to a value equal to the inside diameter, and a depth up to $2/3$ of a thickness of the lid.

9. A secondary cell according to claim 7, wherein the diminished portion formed in the lid is provided adjacent to and concentrically around the welded portion of the vent closure.

10. A secondary cell comprising a gastight can including a cylinder and a lid fixed to an opening portion formed in the cylinder, and a secondary cell element accommodated in the can, the lid being fixedly provided with a vent closure in a form of a disk and having a diaphragm openable upon internal pressure of the can exceeding a predetermined value, the vent closure having an outer peripheral portion welded to an opening edge defining a through bore formed in the lid, the through bore including a stepped groove permitting the vent closure to engage therein and sized to slidably receive the vent closure, a circumferential groove formed in a front surface of the lid being outside and surrounding the welded portion of the vent closure.

11. A secondary cell according to claim 10 wherein a heat conducting portion for reducing a sectional area of a heat flow path for heat of the welded portion to pass therethrough is formed between the welded portion of the vent closure and a side wall of the lid defining the groove and positioned closer to the vent closure.

12. A secondary cell according to claim 10, wherein the circumferential groove formed in a front surface of the lid is adjacent to and concentrically surrounds the welded portion of the vent closure.

13. A secondary cell comprising a gastight can including a cylinder and a lid fixed to an opening portion formed in the cylinder, and a secondary cell element accommodated in the can, a cylindrical projection jutting from a front surface of the lid, having a central opening portion and surrounding a through bore formed in the lid including a stepped groove permitting a vent closure to engage therein, the vent closure in the form of a disk having a diaphragm openable upon internal pressure of the can exceeding a predetermined value, the vent closure received within the central opening portion of the projection and having an outer peripheral portion welded to an opening edge defining the central opening portion of the projection.

14. A secondary cell according to claim 13 wherein a heat conducting portion for reducing a sectional area of a heat flow path for heat of the welded portion to pass therethrough is formed by the projection.

15. A secondary cell according to claim 13 wherein a circumferential groove is formed around the projection.

16. A secondary cell according to claim 15 wherein a heat conducting portion for reducing a sectional area of a heat flow path for heat of the welded portion to pass therethrough is formed between the welded portion of the vent closure and a side wall of the lid defining the groove and positioned closer to the vent closure.

17. A secondary cell comprising a gastight can including a cylinder and a lid fixed to an opening portion formed in the cylinder, and a secondary cell element accommodated in the can, the lid being fixedly provided with a vent closure in the form of a disk and having a diaphragm openable upon internal pressure of the can exceeding a predetermined value, the vent closure having an outer peripheral portion welded to an opening edge defining a through bore formed in the lid, the through bore including a stepped groove permitting the vent closure to engage therein and sized to slidably receive the vent closure, a circumferential groove formed in a rear surface of the lid being outside and surrounding the welded portion of the vent closure.

18. A secondary cell according to claim 17 wherein a heat conducting portion for reducing a sectional area of a heat flow path for heat of the welded portion to pass therethrough is formed between a bottom of the groove and a front surface of the lid.

19. A secondary cell according to claim 17, wherein the circumferential groove formed in a rear surface of the lid is adjacent to and concentrically surrounds the welded portion of the vent closure.

20. A lid for a secondary cell, comprising:
   a lid body having a first surface and an opposite second surface and an inner peripheral edge defining a through bore extending longitudinally through and between the first and second surfaces;
   a vent closure including a ring having a first flat surface and an opposite second flat surface and a diaphragm affixed to the first flat surface, the through bore sized and adapted to slidably received the vent closure with the first surface of the lid body and the second flat surface of the ring disposed in a common plane and an outer peripheral edge of the ring and the inner peripheral edge of the through bore facing each other to define a circular welding region; and
   a wall formed on the lid body and disposed radially apart, to and outwardly from the welding region, the wall extending generally longitudinally and at least substantially about the welding region.

21. A lid according to claim 20, wherein the wall is disposed adjacent to the welding region.

22. A lid according to claim 21, wherein the wall extends concentrically about the welding region.

* * * * *